April 7, 1964  W. H. HERAEUS ETAL  3,128,169
PROCESS FOR MAKING QUARTZ GLASS CASINGS
Original Filed Nov. 25, 1953

INVENTORS
WILHELM HEINRICH HERAEUS
HEINRICH MOHN

BY
Burgess Dinklage Sprung
ATTORNEYS

United States Patent Office 3,128,169
Patented Apr. 7, 1964

3,128,169
PROCESS FOR MAKING QUARTZ GLASS CASINGS
Wilhelm Heinrich Heraeus, Hanau am Main, and Heinrich Mohn, Hailer, Kreis Gelnhausen, Germany, assignors to Heraeus Quarzschmelze G.m.b.H., Hanau am Main, Germany, a corporation of Germany
Original application Nov. 25, 1953, Ser. No. 394,462, now Patent No. 2,904,713, dated Sept. 15, 1959. Divided and this application Oct. 15, 1958, Ser. No. 767,364
Claims priority, application Germany Nov. 27, 1952
4 Claims. (Cl. 65—111)

This invention relates to quartz lamps used both for therapeutic and visible lighting or illumination purposes. This application is a division of application Serial No. 394,462, filed Nov. 25, 1953, now Patent 2,904,713, as a continuation-in-part of corresponding application Serial No. 367,687, filed July 13, 1953, now Patent 2,954,496.

One object of this invention is to produce quartz lamps of high emission of energy or light, both ultra-violet and illuminating, and maintaining such emissions for a long time at high efficiency.

Another object of this invention is to provide quartz glass casings for gas discharge tubes, said casings being made from substantially pure quartz glass and imparting to gas discharge tubes and lamps a prolonged service life and other valuable properties.

A further object of this invention is to provide a process of making such casings from quartz glass.

Still another object of this invention is to provide a process of producing substantially pure quartz glass which is suitable not only for making casings of gas discharge tubes and lamps but also for making other quartz glass articles and quartz glass parts of articles and apparatus useful, for instance, for optical instruments and the like.

A further object of this invention is to provide casings of quartz glass for gas discharge tubes which casings are made from quartz glass subjected to a process whereby foreign elements having a harmful effect upon the service life of such gas discharge tubes are rendered harmless.

Other objects of this invention and advantageous features thereof will become apparent as the description proceeds.

Quartz lamps of the high pressure mercury vapor discharge type have been widely used for therapeutic purposes and lately have come into extensive use in street lighting systems. Such quartz lamps, in all manner of use, lose a substantial part of their efficiency by reason of the substantial deterioration in the light transmission efficiency of the quartz glass casing or envelop.

Thus ultra-violet therapeutic lamps, made of quartz glass, rated at 100% efficiency when first used, may for instance lose substantially 40% of their ultra-violet ray emission efficiency after about 1500 hours of use although the ultra-violet ray producing source of the lamp still has many hundreds of additional hours of useful operation. A similar substantial loss occurs in the visible light emission with quartz casing lamps used for illumination purposes although there again the light producing source of the lamp has many hundreds of additional hours of useful operation. Such losses of efficiency commence almost immediately with the operation of the lamps and may be evident on examination after already 100 hours of use; after about 1500 hours of use such sufficiency may have dropped for instance to about 40% or more from its initial efficiency.

Efficiency loss in street illumination is highly uneconomical as such lamps generally have a service span of the light source of well over 3000 hours. In ultra-violet therapeutic lamp uses, the deterioration is not only costly but leaves the user without information how long the lamp can be used with relative exactness of dosage as a therapeutical appliance.

It has been found that high resistance to aging and a considerably prolonged service life are achieved when using a substantially pure quartz glass. The degree of purity of the quartz glass used for making casings for quartz lamps and the like is of the utmost importance with respect to a prolonged service life of such lamps. Casings of gas discharge tubes as they are used in high pressure lamps as well as in low pressure lamps have a remarkably longer service life when made from substantially pure quartz glass than when made as heretofore from quartz glass selected solely for its ability to transmit the rays involved.

It is, therefore, an essential object of this invention to provide quartz glass casings for gas discharge tubes, said casings being made from quartz glass of a high degree of purity.

Thereby not only coarse particles of impurities that are visible to the naked eye or under a low-power microscope must substantially be absent but also impurities which are of very small particle size or are present in the quartz glass in molecular magnitude and therefore not visible.

According to the present invention quartz glass is used which is substantilaly free not only of conductive elements, such as metals, for instance, copper, iron, alkali metals, or alkaline earth metals, or carbon, but which is also substantially free of metalloids such as arsenic and tellurium and of compounds of such elements that exert an unfavorable influence upon the service life of quartz lamp casings made therefrom. Although best results are achieved when using chemically pure quartz glass, in practical operation it is not always possible to produce such chemically pure quartz glass. The amount of impurities present therein, however, must be the lowest possible amount achieved in ordinary manufacture, i.e., the quartz glass must be substantially pure.

It is one of the characteristic features of the present invention to use, in the manufacture of quartz glass casings for gas discharge tubes and the like, a quartz glass the degree of contamination of which is so small that formation of seed-like formations or nuclei which will cause subsequent crystallization within the quartz glass is substantially eliminated and, due thereto, the devitrification temperature is considerably increased or, respectively, devitrification of casings made from such substantially pure quartz glass due to exposure to high service temperature is considerably retarded. Surprisingly it was found that, with such a substantially pure quartz glass, the tendency of gas discharge tubes to become discolored in operation is also considerably reduced.

In order to produce quartz glass or quartz glass casings of the required purity, it is necessary to proceed in such a manner that any substantial introduction of impurities into the quartz glass during the manufacture of said casings is excluded. To achieve said purpose, it is advisable to use the purest possible starting material, for instance, pieces of pure rock crystal. Said starting material is then purified as far as possible and the melting process and preferably the building up and drawing processes are carried out in such a manner that not only any substantial introduction of impurities into the quartz glass is excluded, but also under conditions, for instance, in an atmosphere whereby foreign elements that may be present in the quartz glass are rendered harmless or eliminated and carried away.

Processes of manufacture are preferred which take place at comparatively high temperatures, for instance, between 2000° C. and 2,400° C. At such temperatures impurities are separated or evaporated. Care must be taken, of course, that such high temperatures exert their purifying effect uniformly over the entire cross section of the molten quartz.

An especially advantageous process consists in melting and building up such substantially pure quartz glass in a gas atmosphere, for instance, in the atmosphere of a noble gas, such as argon or helium, or in the atmosphere of a gas like oxygen or chlorine or other halogens. The presence of such gases not only impedes introduction of foreign elements but gases, such as oxygen or halogens, especially chlorine, react with the contaminating elements and cause evaporation thereof in the form of volatile compounds.

Thereby conditions and especially temperatures are chosen whereby the reactivity of said gases with the atoms composing the quartz glass to be purified is insignificant.

Occluded gases as well as any compounds formed therewith are readily driven off and expelled by heating to a suitable temperature, if necessary, in a vacuum.

By this means it is possible to reduce the amount of impurities, even when present in molecular or atomar size, to a minimum or to substantially eliminate the same.

Should, in spite of proper precautions, larger particles of impurities from the furnace walls or drawing tools, for instance, impurities of a size visible to the naked eye, penetrate into the quartz glass, it is possible to subsequently remove said coarse particles of impurities, for instance, by locally heating the corresponding part of the shaped quartz casing. Another way to render said coarse particles harmless consists in uniformly distributing the same throughout the quartz glass by diffusion or even, although not as advantageously, by mechanical homogenization. Such a procedure is also capable of reducing the formation of vitrification seeds or nuclei which cause premature aging of the quartz lamp. Such homogenization process will be described in greater detail hereinafter.

The treatment with halogens and especially with chlorine is of particular advantage and causes a noteworthy advance in the art, and is described in detail in co-pending application Serial No. 767,363.

In principle, this process of chlorine treatment consists in continuously passing finely comminuted rock crystal material or the like through a fusion zone, continuously directing a stream of chlorine in the path of such continuously flowing rock crystal material to envelop said rock crystal particles in such chlorine gas, collecting the molten particles in a mass of substantially pure quartz glass, continuously building up such quartz glass mass from such molten particles, and removing and/or further working up the resulting substantially pure quartz glass to the desired articles, especially to casings for gas discharge tubes.

When melting and drawing quartz glass in order to produce casings of gas discharge tubes, it is, above all, necessary to eliminate any free hydrogen that has not combined with the oxygen supplied to the reaction chamber or with any atmospheric oxygen present therein.

The presence of other foreign gases, of course, is a burden or dead load on the process and impairs its thermal economy. It is, however, not necessary to exclude foreign indifferent gases, for instance, nitrogen or noble gases. Their presence, under certain circumstances, has the advantage that embedding of other impurities in the quartz glass is rendered difficult or even completely prevented.

The attached drawings illustrate a preferred embodiment of apparatus for carrying out the process according to the present invention and of ultra-violet and illuminating lamps provided with casings made according to the present invention. In these drawings.

Figure 1:
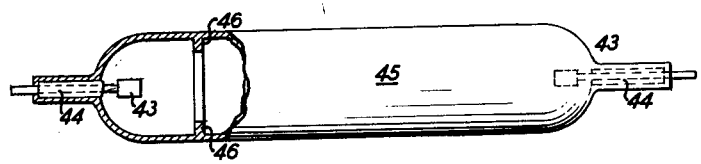
FIG. 1 shows a lamp for producing ultra-violet rays which serves for the generation of ultra-violet rays, said lamp having a casing made of substantially pure quartz glass according to the present invention.

Chlorine treatment of quartz raw material in the molten state according to the description of copending application Serial No. 767,363 considerably improves the properties of the resulting quartz glass and of casings of gas discharge tubes and lamps made therefrom with respect to their permeability to ultra-violet rays and their service life.

When proceeding according to that invention, foreign elements cannot become embedded in the quartz glass at the place where it is molten and built up to a quartz glass body because said foreign elements form readily volatile compounds with chlorine and escape in the form of such compounds. Thus, for instance, sodium, magnesium, calcium, barium, aluminium, copper, zinc, titanium, and/or iron ore are removed in the form of their chlorides. Due thereto, quartz glass casings according to that invention exhibit a high resistance against recrystallization because substantially no crystallization nuclei or seeds are present in the quartz glass treated in this manner. This has the further advantage that aging of tubes and lamps made with such casings is very substantially retarded. Devitrification and discoloration are also considerably retarded and the service life of gas discharge tubes and lamps provided with such casings is considerably prolonged.

The process according to that invention has the advantage that, when working with the indicated chlorine concentration, occlusion of free hydrogen or intercalation of hydroxyl groups into the structure or texture of the quartz glass is avoided and said quartz glass is composed to a much greater extent of silicon dioxide or silicon tetroxide tetrahedrons than this is the case in any other known process of melting rock crystals. The presence of such readily volatile gases as hydrogen in quartz glass as made heretofore has a reducing effect and causes formation of lower silicon oxides and especially silicon monoxides, which lower silicon oxides considerably impair the chemical properties and the transmissivity for rays of quartz glass containing such gases.

It is evident that the quality of quartz glass material of which casings for glass discharge tubes are made is not only dependent upon the impurities which can be determined as residue, for instance, on evaporating quartz glass by means of hydrogen fluoride, but also upon its content of volatile substances and especially of hydrogen and of compounds which contain the same elements as silicon dioxide itself, i.e., lower oxides of silicon, such as silicon monoxide.

By subjecting quartz raw material to an especially intense chlorine treatment as described in copending application Serial No. 767,363, quartz glass can be obtained which is free of any fluorescence. Fluorescence, as is known, is caused by the presence of centers of disturbances in the lattice structure of a substance. For instance, very small amounts of a foreign element present in a material are capable of causing fluorescence. Absence of fluorescence in quartz glass, therefore, can be considered as proof of highest purity.

Casings of gas discharge tubes composed of high purity quartz glass according to that invention ordinarily exhibit, due to their high purity, a greater transmissivity to ultra-violet rays than casings made of commercial quartz glass. Said transmissivity can be particularly observed in the shortwave part of the spectrum up to about 200–300 angstroms. An immediate result thereof is a higher yield of ultra-violet UVC (ultra-violet rays in the "C" range, i.e. up to about 2800 angstroms).

The absence of hydrogen in casings of gas discharge tubes and lamps produces further advantages. Evacuation and heating time on manufacturing tubes and lamps with quartz glass according to this invention is considerably reduced. Furthermore, in the operation of gas discharge tubes and lamps made with unheated quartz glass, occluded hydrogen emanates from the casing walls and causes ionization of the gas discharge path. These disturbances are completely eliminated when using as casing material quartz glass according to the present invention which is substantially free of hydrogen.

While it is advisable, when carrying out the present invention, to prevent any occlusion of hydrogen and/or embedding of lower silicon oxides, especially of silicon monoxide, in contrast thereto, inclusion of silicon chlorides into the silicon dioxide structure in the course of the chlorine treatment in accordance with the invention does not cause disadvantages. On the contrary, such inclusion is often of advantage. Especially suitable are the high molecular silicon chloride compounds formed which are stable even at temperatures up to 800–900° C. Such high molecular silicon chlorides, incorporated into the structure of quartz glass, decrease its reactivity. Such decrease in reactivity causes considerable retardation of the onset of devitrification at higher temperatures. Consequently, the decrease in ultra-violet intensity, for instance, in a mercury high-pressure lamp, sets in only after such lamps or tubes have been used for a considerably longer period of time than lamps or tubes the casings of which are made of untreated quartz glass as used heretofore.

The use of chlorination-produced substantially pure quartz glass considerably improves the service life of ultra-violet tubes and lamps of various kinds, and especially of tubes and lamps for technical and illuminating purposes. For such purposes there have mostly been used high pressure and highest pressure mercury discharge tubes and especially lamps provided with an additional gas filling to cause ignition. Usually noble gases are used as such filling. Such lamps have the form of a tube of small cross-section or spherical or capillary form. Such luminous-discharge lamps or tubes made of quartz glass are exposed at their inner walls to especially high thermal stress due to their high energy density. The voltage drop per cm., for instance, is of the magnitude of several hundred volts, at a current intensity of the magnitude of several or only a few amperes. Thereby, a surface luminous intensity of the tied up gas discharge is produced which is of the magnitude of tens of thousands of international candles per sq. cm. The temperature in such tubes rises to 700° C. to 1200° C. (1292° F. to 2192° F.).

With mercury-discharge tubes, as they were used heretofore in the manufacture of technical and therapeutic ultra-violet lamps, aging due to "etching or corrosion" and discoloration of the quartz glass casing occurs during prolonged use of such lamps. Illuminating lamps as heretofore employed, however, exhibit devitrification and discoloration already after a few hours of use. Such rapid onset of devitrification and discoloration is the reason why heretofore the use of such illuminating lamps was considered impractical.

The difference in the service life of gas-discharge tubes as heretofore employed and gas-discharge tubes with quartz glas casings made according to the present invention is so remarkable that technical and therapeutic ultra-violet lamps provided with burners according to this invention, and even more so illuminating lamps provided with the new gas discharge tubes, open entirely new technical possibilities. It is thus possible, to considerably prolong the time when devitrification, seriously affecting the output in light energy (at least by 40%) sets in. Furthermore, progressive devitrification, after it has set in, is slowed down to such an extent that at the end of the normal service life of a high-pressure lamp the entire ultra-violet emission may decrease only as little as 5% to 10% while lamps as heretofore used may lose about 40% to 50% of said ultra-violet emissivity within the same A. range.

The new burners with gas discharge tubes have the additional advantage that they turn out more uniformly during manufacture than heretofore possible. Consequently, waste on large scale manufacture is reduced. Likewise, the working conditions during heating and evacuating the tubes are simplified.

Casings for gas discharge tubes obtained by the chlorine treatment, during building up of the quartz glass blank and/or during shaping, molding, drawing, or otherwise forming said casings, as described in copending application Serial No. 767,363, have the further advantage that less shrinkage is observed on making such casings. This is a very important feature of the present invention because it eliminates, to a great extent, waste and rejects and, thus, allows more economic production of said casings.

Gas discharge tubes having quartz casings and envelopes are employed for the generation of ultra-violet rays and of visible light. To utilize such tubes for generating ultra-violet rays has attained great importance for therapeutic as well as for technical purposes. Mercury discharge tubes have proved to be especially suitable. Other metal-vapor discharge tubes, for instance, of cadmium, are of minor importance. In order to attain highest light-emission, it has been suggested to fill the discharge tube with highly volatile compounds, for instance, with chlorides of metals which are only difficultly volatile. Said chlorides dissocaite in the discharge tube so that the characteristic spectrum of the metals is emitted.

In the case of mercury discharge lamps a distinction is made between low pressure discharge lamps and high pressure discharge lamps, the border line between both types being at a pressure of about 10 to 100 torrs. Discharge lamps at pressures of more than about 30 atmospheres are designated as highest pressure discharge lamps. The present invention relates more particularly to the improvement of gas discharge tubes for high pressure discharge and, at the same time, for highest pressure discharge.

Quartz glass casings for gas discharge tubes made according to the process of treating the starting material wth chlorine, as described in detail in application Serial No. 767,363, represent an approximate standard for determining which amount of impurities is permissible in such casings in order to guarantee an extraordinarily high service life of said casings and consequently of such gas discharge tubes.

Substantially higher amounts of impurities than those obtained by said chlorine treatment are not permissible, although a small increase in such impurities will not considerably shorten the effective service life of such tubes. Regardless, in what manner the quartz glass casings were produced and from what kind of quartz glass material they were made, it is readily possible to determine whether the quartz glass is sufficiently pure by comparing said casings with casings made from quartz glass treated with chlorine. When using for such other processes a starting material of the highest possible purity and observing the above mentioned precautionary measures, it is possible to produce quartz glas casings of extraordinarily high effective service life, comparable in their effectiveness with quartz glass casings made from chlorine treated quartz glass.

To increase the service life of casings for gas discharge tubes made from quartz glass which does not fully correspond to the above mentioned requirements with regard to purity, i.e., the purity of which does not fully correspond to that of chlorine treated guartz glass, said casings may be subjected to a homogenizing treatment. Said treatment which forms a further object of the present invention consists in homogenizing quartz glass in such a manner that foreign elements included in such quartz glass are disributed as finely and uniformly as possible throughout the quartz glass mass. It is possible, in this manner, for instance, to render quartz glass produced by other methods than by chlorine treatment approximately equivalent in its quality and prolonged service life, when used as casing for gas discharge tubes, to quartz glass subjected to chlorine treatment. It is also possible to still further improve the stability of quartz glass subjected to the chlorine treatment, described above more in detail, by homogenizing and uniformly and evenly distributing therethrough any traces of impurities which might be present in such chlorine treated quartz glass.

Figure 3:
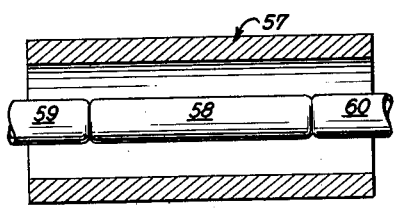
FIG. 3 illustrates a portion of a furnace for making a substantially pure cylinder-like quartz glass body wherein a preferred form homogenizing means is shown.

Homogenizing is effected, for instance, by mechanically stirring the molten quartz mass. For this purpose the molten mass 38 to be homogenized is thoroughly worked, as shown in FIG. 3 of the attached drawings, in chamber 57 heated to melting temperature, by means of stirring rods 59 and 60 which are moved relatively toward and away from each other. Progress of homogenization may be observed, for instance, by optical processes. An especially advantageous process of homogenizing quartz glass is the dispersing process whereby quartz glass is exposed to the action of supersonic waves.

The stirring process is preferably carried out in such a manner that any direct contact of the material with the walls of the furnace, etc., is avoided, for instance, a body of quartz glass 58 is held at both ends by suitable supports 59 and 60 and is rotated. Said supports 59 and 60 are moved relatively toward and away from each other but in a manner that any contact of the softened mass with the walls, for instance, of heating chamber 57 is avoided. The body of quartz glass 58, freely suspended and attached to rods 59 and 60, is introduced into cylindrical furnace 57 heated by an oxygen-hydrogen blow pipe or electrically by resistance elements. The temperature of said furnace is so high that softening of the quartz mass takes place. Said softened mass is then alternately compressed and stretched by moving said rods relatively toward and away from each other. A preferred mode of carrying out this stirring process consists in twisting the rods against each other. Since a furnace as used for such treatment usually has only a comparatively narrow zone of highest temperature, the quartz glass body is advanced therein step by step so as to treat its entire length. In this manner a mass of completely homogenized quartz glass is obtained.

It is also possible to homogenize pieces of quartz glass, at least to a limited depth, by subjecting the same to a treatment with supersonic waves. For this purpose the work piece 58 to be treated, as shown in FIG. 3 of the attached drawings, is attached by fusing to a quartz ware support 53 at one end and to a piece of quartz glass 60 which is connected to a magnetostriction oscillator (not shown) at the other end.

The short quartz glass cylinder 58 to be subjected to the action of supersonic waves is placed into electric resistance furnace or high frequency furnace 57 which is heated to a temperature of at least 1600° C. and preferably to a temperature between 1800° C. and 2200° C. A magnetostriction oscillator (not shown) as well as an iron rod (not shown) serving as coupling element are cooled. The end of said iron rod has a cup-like shape. A piece of quartz glass 60 is fit, by grinding, into said cup-like end and is clamped therein in such a manner that a satisfactory seal and contact are assured.

The quartz glass cylinder 58 held at its other end by quartz ware support 59 is then exposed at the above indicated temperature to the action of supersonic waves with a frequency of 10,000 hertz units to 30,000 hertz units, and preferably with a frequency of 15,000 hertz units and 20,000 hertz units. Since the depth of penetration to which the supersonic waves penetrate the quartz glass cylinder is limited, the homogenizing effects achieved thereby extend only to a certain depth of the heated quartz glass cylinder is limited, the homogenizing effects achieved thereby extend only to a certain depth of the heated quartz glass cylinder. Thereby the particles of the quartz glass material perform oscillating movements. Due to the pressure of the sound rays, limited local displacements or dislocations occur within the material subjected to said supersonic pressure.

As has been mentioned above, said homogenizing treatment causes uniform distribution of the impurities in a quartz glass mass. Impurities present in non-homogenized quartz glass readily serve as seed-like formations or nuclei which are responsible for more or less pronounced recrystallization and, consequently, for devitrification and, furthermore, for certain reduction phenomena causing discoloration. When heating pieces of such non-homogenized quartz glass, for instance, to 1000° C., small areas or spots become visible after about 10 hours' exposure to such a temperature, whereas, before such heating, such spots could not be detected by the naked eye or, if they could be detected at all, then only by a sensitive striae method. Said spots increase in size on continued heating. After heating for several weeks they form large recrystallization centers having a diameter up to many millimeters. Of course, speed and extent of devitrification is dependent also on other factors.

More exactly speaking, two different groups of inclusions of foreign elements must be distinguished, namely such which are not at all or only slightly affinitive to silicic acid. Such impurities having a particle size above $100\mu$ and up to $1000\mu$, such as particles of carbides or particles of difficultly soluble elements, are reduced in size to a particle size below $100\mu$ and preferably below $10\mu$ by the above described homogenizing treatment. As a result thereof the tendency of said particles to act as seeds or nuclei causing harmful reactions is considerably reduced.

The other type of impurities are those which are capable of forming compounds with quartz glass and of interlinking therewith to a glass containing larger or smaller amounts of silicic acid. Such impurities are certain metal oxides, especially oxides of alkaline earth metals. Thereby frequently mixed glasses with a particle size up to 3 mm. and even more are formed. Said mixed glasses are not directly visible to the naked eye but can be detected only by interference, striae, or polarization methods. Such embedded particles of mixed glass, of course, rapidly crystallize on heat treatment and form thereby devitrification centers. The reactivity of homogenized quartz glass is the lower the more such inclusions are interlinked and the more thoroughly the interlinked glass complex is distributed within the silicic acid lattice. Uniform distribution of the various reduction products, such as silicon monoxide and other stages of reduction, is also of importance for the production of quartz glass of superior quality and is also achieved by homogenization as described above.

It shall, of course, be left open to question whether besides the above indicated effects, other effects are additionally produced by a homogenizing treatment according to this invention and whether said other effects are also responsible for the improvements achieved with respect to aging, and especially to devitrification and reduction phenomena causing discoloration.

The discharge chambers, the so-called "burners," in high pressure lamps and highest pressure lamps ordinarily consist of quartz glass. In most cases the casing of the burner is a tubular body, usually of elongated shape or bent in U-form. Of course, devices of this type of spherical shape or provided with spherical extensions are also known. Capillary tubes are also used especially when high energy concentration of the gas discharge is required. The casings or envelopes of such burners are made of quartz glass tubes, which were drawn, for instance, from the blank that was fused by a gas or electric process.

An example of a burner useful for the production of ultra-violet rays, especially in therapeutic lamps, which, however, may be used for many other technical purpose is illustrated in FIG. 1. It represents a mercury high pressure lamp, the quantity of mercury present therein being regulated in such a way that it completely vaporizes during operation. Electrodes 43, supplied with electric current by means of current inlets 44, are arranged in quartz glass casing 45, according to this invention. Screen 46 prevents impurities from passing from the electrodes into the gas chamber. Casing 45 consists of quartz glass which has been molten and drawn according to the above described process of this invention in the presence of chlorine gas, and thus, is substantially pure. As already mentioned, the improvement achieved by this invention is of considerable importance for ultra-violet radiators not only for therapeutic use but also for various technical purposes, for instance, in connection with various physical apparatus, laboratory devices, and as source for ultra-violet rays for chemical reactions. The improvement according to this invention is especially useful in connection with high pressure lamps in devices for making blueprints because such devices require as uniform emission as possible over the entire length of the burner.

Figure 2:
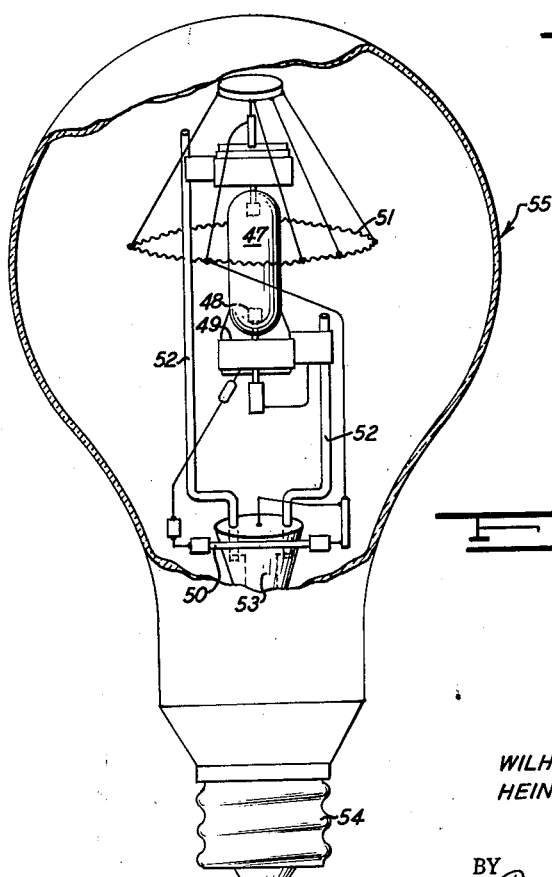
FIG. 2 illustrates a mercury vapor mixed light lamp, i.e., a lamp for lighting or illuminating purposes in which, besides the gas discharge radiator, a coiled filament is arranged, said lamp also being provided with a casing made of substantially pure quartz glass.

In FIG. 2 a lamp for illuminating purposes is illustrated which contains a gas discharge lamp according to the present invention. Said lamp is a mercury vapor-mixed light lamp, i.e., a lamp combining a mercury vapor discharge tube with a coiled up filament lamp, both serving at the same time as a source of light. Burner casing 47 is made of quartz glass. Two electrodes 48 and auxiliary electrode 49 provided to insure perfect ignition, and ignition resistance 50 are arranged in said lamp. Coiled up filament 51 fulfills a double task. It serves as a further source of light and, at the same time, as a series resistance for the gas discharge tube. Parts supplying the electric current are conductor 52, which also serves as a support, pinch foot 53 for vacuum tight introduction of the electric wire, and screw cap 54 for screwing in the bulb. All the parts mentioned are sealed in glass bulb 55. In electric lamps for illuminating purposes frequently the gas discharge tube is not surrounded by a coiled up filament and the series resistance is arranged outside of the lamp body. In this case, for instance, the series resistance may be a simple ohmic resistance, or an inductive resistor, or a filament lamp. All these illuminating lamps according to the present invention have a guaranteed considerably increased service life.

The above described devices are, of course, merely examples of embodiments of this invention and serve to demonstrate the advance in the art achieved thereby. The invention, of course, is by no means limited thereto and may find various other applications.

Instead of building up a substantially pure quartz glass suitable for producing casings for gas discharge tubes by means of silicon dioxide, it is also possible to use other silicon compounds which decompose at high temperature to form silicon dioxide, and particularly silicon compounds which are hydrolytically decomposed to silicon dioxide. Silanes which react with steam or oxygen to form silicon dioxide are, for instance, suitable for certain purposes. The conditions regarding the treatment with chlorine or chlorine compounds correspond to those described above for directly building up quartz glass from silicon dioxide. Use of organo-silicon compounds as starting materials is quite satisfactory for many purposes.

It is advisable to use very pure silicon dioxide as starting material for carrying out the invention in the manner described above and, furthermore, to take care that during the various steps of processing impurities are prevented from getting into the quartz glass. Proceeding in this manner will insure that casings for gas discharge tubes of the highest purity exhibiting all the above mentioned advantages are obtained. The process according to the present invention, however, has the further advantage that it is also possible to use somewhat less pure starting materials, such as rock crystals having included therein, for instance, certain metal oxides and/or silicates. Such impurities are also substantially completely removed by subjecting said impure starting material to the process of this invention.

Substantially pure quartz glass, obtained according to the above described treatment process, can be advantageously used not only for making casings for gas discharge tubes or lamps but also for other apparatus and parts of apparatus requiring quartz glass of a quality satisfactory to optical requirements. Such parts of apparatus comprise, for instance, transparent media which bundle rays in order to concentrate or beam them or to disperse them or which serve for rectilinear propagation of parallel directed radiation. Such transparent media comprise, for instance, prisms which deflect a rectilinear path of rays in such a manner that the light is spectroscopically dispersed or separated, or lenses which collect light concentrically around an optical axis or which disperse light whereby refracting influences may compensate each other. Besides prisms and lenses, such parts of optical apparatus and devices comprise also plane plates which are used, for instance, for making filters and filter cuvettes or for sealing chambers from which a path of optical rays is to be conducted into an area subjected to other conditions of pressure.

Various types of glass and crystals were used heretofore for such transparent media. Thereby it is of great importance that optical disturbances, such as striae, occlusions or inclusions which change the refractory power of said materials or which absorb optical rays, are substantially avoided.

This invention produces quartz glass of considerably higher purity than quartz glass as heretofore used for parts of optical and the like apparatus and devices. Said higher purity is also responsible for the higher transparency to ultra-violet light of parts of optical apparatus made therewith.

The transparency of quartz glass reaches into the zone of 1600 angstroms. In the range between about 2200 angstroms and 1600 angstroms, transparency decreases quite abruptly. For instance, the transparency of a normal quartz glass plate of 10 mm. thickness at 2200 angstroms is about 35% and at 1600 angstroms about 10%. When using glass plates of the same thickness made from quartz glass, treated for instance with chlorine according to the present invention, the transparency to ultra-violet rays at 2000 angstroms is about 85%, at 1800 angstroms still about 80%, and at 1700 angstroms about 30% to 50%, i.e., at least about three times as high as that of ordinary quartz glass heretofore used in optical apparatus and parts of optical apparatus and the like. Due to the higher purity of quartz glass treated with chlorine or according to the present invention, such optical apparatus and parts of optical apparatus and the like are usually substantially free of striae and of inhomogeneities.

Chlorine treatment may be additionally carried out during subsequent homogenizing of and working and processing said quartz body or mass to desired parts of optical apparatus. Working up, further processing, shaping, molding, or otherwise forming articles, parts or products from the quartz glass treated according to this invention is carried out by the standard methods. In such standard methods, for instance, the known operations of press-molding, upsetting, and stretching of quartz glass can readily be performed in the presence of chlorine. The chlorine treatment can also be combined with the homogenization of the molten quartz glass as heretofore described, i.e., whereby striae and optical inhomogeneities which are present in said quartz glass, are eliminated. Chlorine treatment during homogenization has the advantage that an extraordinarily intimate contact even of the smallest quartz particles with chlorine is insured.

We claim:

1. In the process for making quartz glass casings for ultraviolet lamps from quartz glass containing amounts of impurities, selected from the group consisting of the conductive elements, carbon, metalloids, compounds containing such elements, including the oxides of silicon with a lower oxygen content than silicon dioxide, and hydrogen normally capable of forming centers of recrystallization including the steps, in which the glass is heated to a melting temperature, shaped in the form of a casing and allowed to solidify in this form, the improvement which essentially consists of the combination with said steps of reducing the particle size of said impurities to below about 100μ, and homogenizing and uniformly dispersing the same throughout said quartz glass prior to solidification in the form of said casing.

2. Improvement, according to claim 1, in which the particle size of said impurities is reduced to below about 10μ.

3. Improvement, according to claim 1, in which said homogenization and dispersion of said impurities is effected by placing the melted quartz glass mass between supports in a zone heated to the melting temperature of said quartz glass mass and moving said supports while the mass is supported thereby relatively toward and away from each other.

4. Improvement, according to claim 1, in which said homogenization and dispersion is effected by subjecting the molten quartz glass mass to the action of supersonic waves.

References Cited in the file of this patent

UNITED STATES PATENTS

| | | |
|---|---|---|
| 1,003,271 | Kent | Sept. 12, 1911 |
| 1,549,597 | Miller | Aug. 11, 1925 |
| 1,612,628 | George | Dec. 28, 1926 |
| 2,089,546 | Dudding et al. | Aug. 10, 1937 |
| 2,236,708 | Grimditch | Apr. 1, 1941 |
| 2,353,668 | Hinman | July 18, 1944 |
| 2,367,595 | Marden | Jan. 16, 1945 |
| 2,568,459 | Noel | Sept. 18, 1951 |
| 2,794,301 | Law et al. | June 4, 1957 |
| 2,904,713 | Heraeus et al. | Sept. 15, 1957 |

FOREIGN PATENTS

| | | |
|---|---|---|
| 254,502 | Switzerland | Dec. 16, 1948 |